US006640313B1

(12) United States Patent
Quach

(10) Patent No.: US 6,640,313 B1
(45) Date of Patent: Oct. 28, 2003

(54) MICROPROCESSOR WITH HIGH-RELIABILITY OPERATING MODE

(75) Inventor: Nhon Quach, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,098

(22) Filed: Dec. 21, 1999

(51) Int. Cl.$^7$ .................................................. G06F 11/00
(52) U.S. Cl. .............................. 714/10; 712/1; 712/43
(58) Field of Search .............................. 714/11, 12, 17, 714/10; 712/43, 229, 20; 700/4, 5

(56) References Cited

U.S. PATENT DOCUMENTS

| | | | | |
|---|---|---|---|---|
| 4,912,707 A | * | 3/1990 | Kogge et al. | 712/228 |
| 5,475,856 A | * | 12/1995 | Kogge | 700/12 |
| 5,530,804 A | * | 6/1996 | Edgington et al. | 703/28 |
| 5,535,410 A | * | 7/1996 | Watanabe et al. | 345/505 |
| 5,561,775 A | * | 10/1996 | Kurosawa et al. | 712/229 |
| 5,664,214 A | * | 9/1997 | Taylor et al. | 712/20 |
| 5,748,873 A | * | 5/1998 | Ohguro et al. | 714/10 |
| 5,903,771 A | * | 5/1999 | Sgro et al. | 712/20 |
| 6,279,119 B1 | * | 8/2001 | Bissett et al. | 703/23 |

OTHER PUBLICATIONS

Marsala. Anthony; Kanawati, Basel, "PowerPC Processors", 1994, IEEE Catalog No.: 94TH0599–1, ISBN: 0–8186–5320–5, Proceedings of the 26th Southeastern Symposium, pp. 550–556.*

Keith Diefendorff, Microprocessor Report,Nov. 15, 1999, p. 8, vol. 13, No. 15.

Keith Diefendorff, Power4 Focuses on Memory Bandwidth, Oct. 6, 1999, pp. 11–17.

* cited by examiner

Primary Examiner—Robert Beausoliel
Assistant Examiner—Christopher McCarthy
(74) Attorney, Agent, or Firm—Blakely, Sokoloff, Taylor & Zafman LLP

(57) ABSTRACT

The present invention provides a processor capable of operating in high reliability and high performance modes in response to mode switch events. Execution resources of the processor are organized into multiple execution clusters. An issue unit provides different instructions to the execution clusters in high performance mode. The issue unit provides the same instructions to the execution clusters in high reliability mode and results generated by the different execution clusters are compared to detect soft errors. The processor may be switched between the high reliability and high performance mode under software control or in response to the detection of certain conditions, such as the execution of certain types of process threads. These include process threads from the operating system kernel, process threads comprising uncacheable instructions, and machine check process threads.

23 Claims, 10 Drawing Sheets

FIG. 1

MICROPROCESSOR WITH HIGH-RELIABILITY OPERATING MODE

BACKGROUND OF THE INVENTION

1. Technical Field

The present invention relates to microprocessors and, in particular, to microprocessors capable of operating in high-reliability modes.

2. Background Art

Soft errors arise when alpha particles or cosmic rays strike an integrated circuit and alter the charges stored on the voltage nodes of the circuit. If the charge alteration is sufficiently large, a voltage representing one logic state may be changed to a voltage representing a different logic state. For example, a voltage representing a logic true state may be altered to a voltage representing a logic false state, and any data that incorporates the logic state will be corrupted.

Soft error rates (SERs) for integrated circuits, such as microprocessors ("processors"), increase as semiconductor process technologies scale to smaller dimensions and lower operating voltages. Smaller process dimensions allow greater device densities to be achieved on the processor die. This increases the likelihood that an alpha particle or cosmic ray will strike one of the processor's voltage nodes. Lower operating voltages mean that smaller charge disruptions are sufficient to alter the logic state represented by the node voltages. Both trends point to higher SERs in the future. Soft errors may be corrected in a processor if they are detected before any corrupted results are used to update the processor's architectural state.

Processors frequently employ parity-based mechanisms to detect data corruption due to soft errors. A parity bit is associated with each block of data when it is stored. The bit is set to one or zero according to whether there is an odd or even number of ones in the data block. When the data block is read out of its storage location, the number of ones in the block is compared with the parity bit. A discrepancy between the values indicates that the data block has been corrupted. Agreement between the values indicates that either no corruption has occurred or two (or four . . . ) bits have been altered. Since the latter events have very low probabilities of occurrence, parity provides a reliable indication of whether data corruption has occurred. Error correcting codes (ECCs) are parity-based mechanisms that track additional information for each data block. The additional information allows the corrupted bit(s) to be identified and corrected.

Parity/ECC mechanisms have been applied extensively to caches, memories, and similar data storage arrays. These structures have relatively high densities of data storing nodes and are susceptible to soft errors even at current device dimensions. Their localized array structures make it relatively easy to implement parity/ECC mechanisms. The remaining circuitry on a processor includes data paths, control logic, execution logic and registers ("execution core"). The varied structures of these circuits and their distribution over the processor chip make it more difficult to apply parity/ECC mechanisms.

One approach to detecting soft errors in an execution core is to process instructions on duplicate execution cores and compare results determined by each on an instruction by instruction basis ("redundant execution"). For example, one computer system includes two separate processors that may be booted to run in either a symmetric multi-processing ("SMP") mode or a Functional Redundant Check unit ("FRC") mode. In SMP mode, instruction execution is distributed between the processors to provide higher overall performance than single processor systems. In FRC mode, the processors execute identical code segments and compare their results on an instruction by instruction basis to determine whether an error has occurred. The operating mode can only be switched between SMP and FRC modes by resetting the computer system.

The dual processor approach is costly (in terms of silicon). In addition, the inter-processor signaling through which results are compared is too slow to detect corrupted data before it updates the processors' architectural states. Consequently, this approach is not suitable for correcting detected soft errors.

Another computer system provides execution redundancy using dual execution cores on a single processor chip. This approach eliminates the need for inter-processor signaling, and detected soft errors can usually be corrected. However, the execution resources are dedicated to operate in FRC mode, and though the dual core approach consumes less silicon than the dual processor approach, it still requires relatively large processor chip.

The present invention addresses these and other deficiencies of available high reliability computer systems.

SUMMARY OF THE INVENTION

The present invention provides a processor in which clustered execution resources may be switched dynamically between operating in a high reliability mode and a high performance mode.

In accordance with the present invention, the execution resources of a processor are organized into first and second execution clusters. An issue module provides instructions to the first and second execution clusters according to the execution mode of the processor. When the processor is in a high performance (HP) execution mode, the issue module provides different instructions to the first and second execution clusters. When the processor is in a high reliability (HR) execution mode, the issue module provides identical instructions to the first and second execution clusters.

For one embodiment of the invention, the processor includes a check unit that is activated in HR mode and deactivated in HP mode. The check unit compares the execution results generated by the first and second execution clusters when it is activated, and signals an error when the execution results do not match. The processor may switch between HP and HR modes under software control or in response to the occurrence of selected events.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

Figure 1:
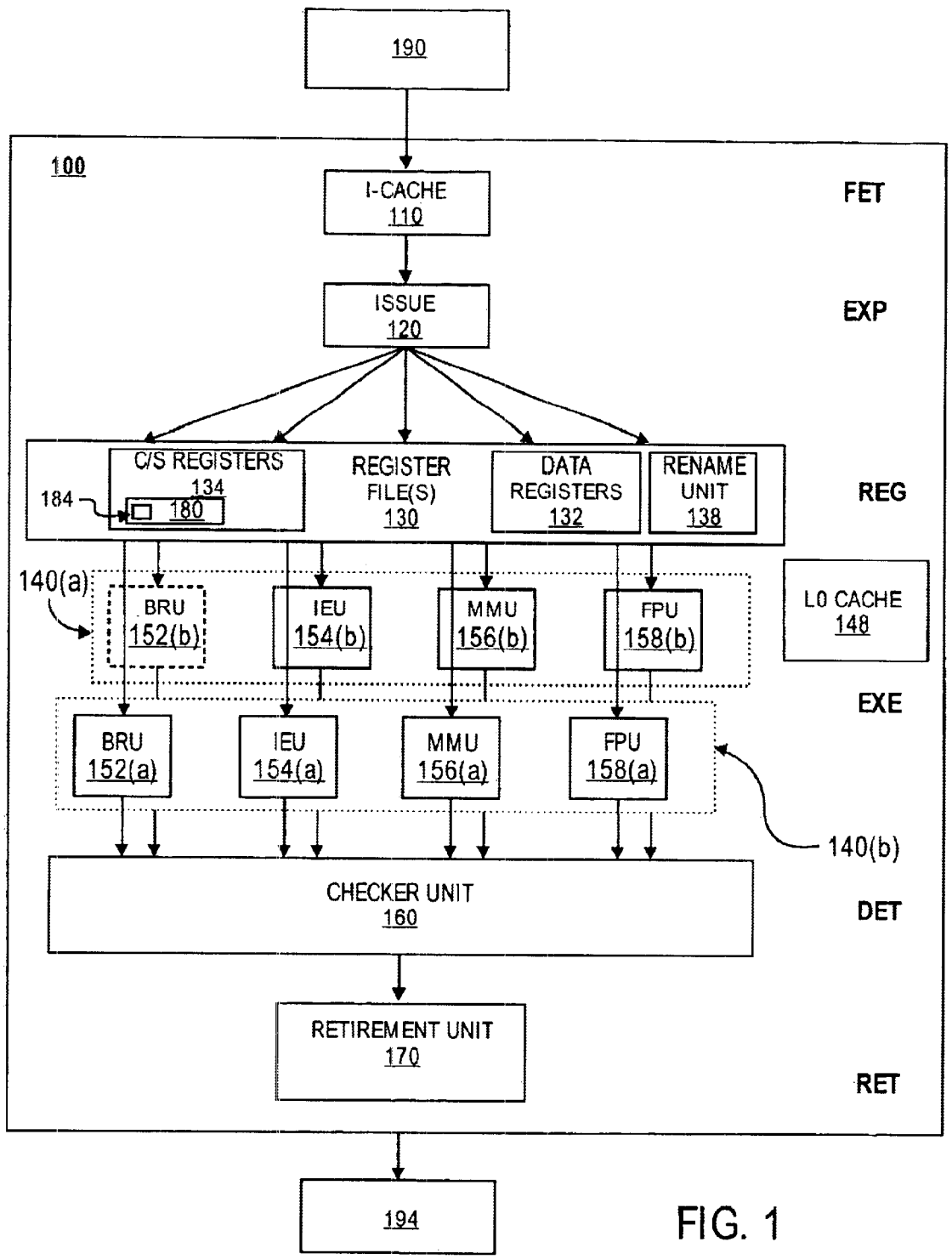
FIGS. 1 is a block diagram of one embodiment of a processor in accordance with the present invention.

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a flexible approach to mitigating the effects of soft errors in a processor without increasing the processor's chip area significantly. The processor's execution resources are dynamically adjusted to operate in a high reliability (HR) mode or a high performance (HP) mode, according to the type of code being handled. This approach recognizes that not all computer code is critical to the integrity of a computer system, even one that is designed to execute code with high reliability. For example, code associated with the operating system kernel and code that operates directly on the platform hardware is preferably executed in HR mode. Errors in processing either type of code can cause the entire computer system to crash, and such errors are to be avoided at all costs. For these critical code types, the hardware cost of implementing redundant execution is more than balanced by the elimination of system crashes that might otherwise occur.

In addition, processors designed to implement the IA64 instruction set architecture (ISA) of Intel® Corporation, provide a sequential execution mode for handling critical operations such as machine check operations. The instructions for these operations are identified through a UC ("uncacheable") designation associated with a memory region in which the instructions are stored. The association is typically identified as part of a memory translation mechanism. For example, an indication of the designation may be stored in a translation look aside buffer (TLB) entry associated with the instruction. When the processor detects an instruction having a memory address that is designated UC, it switches to HR mode. Machine check and other UC type codes are also suitable candidates for processing in HR mode.

Most computer code is significantly less likely to crash a computer system or threaten the system's integrity in the event of data corruption. For example, an error in the color or location of a pixel or an error in the value of a database field does not threaten the integrity of a computer system. Redundant execution is a heavy-handed strategy for running these programs reliably. In particular, it consumes execution resources that could otherwise be used to speed the execution of program code.

The present invention supports flexible processing of computer code according to the nature of the code being processed. In accordance with the present invention, selected execution resources of a processor are organized into two or more execution clusters, and an issue unit provides instructions to the execution clusters according to the execution mode in which the processor is operating. A pair of execution clusters suffices for detecting soft errors, which may be corrected by various mechanisms discussed below. Three execution clusters allows soft errors to be detected and uncorrupted results to be identified through a voting scheme. For example, when a soft error occurs, the correct result is assumed to be the result that is the generated by the majority (two) of the execution clusters. The following discussion illustrates the features of the present invention with processor implementing a pair of execution clusters. Persons skilled in the art and having the benefit of this disclosure will recognize the modifications necessary to implement error detection/correction in when three execution clusters are implemented.

In HR mode, the issue module provides identical instructions to each of execution clusters and compares the results generated by each cluster to identify errors. In HP mode, the issue module provides instructions to the execution clusters independently, significantly increasing the processor's instruction throughput. The processor may be switched between HP and HR modes through explicit mode switch instructions or in response to certain mode switch events, e.g. issue of instructions from a memory region that is designated as UC.

A processor implementing the present invention provides redundant execution without the silicon cost of dual execution cores. In addition, the use of a single execution core ("unicore") processor eliminates the overhead associated with synchronizing dual execution cores or saving processor states on mode switches.

FIG. 1 is a block diagram of one embodiment of a processor 100 in accordance with the present invention. Processor 100 includes an instruction cache (I-cache) 110, an issue unit 120, a register file(s) 130, first and second execution clusters 140(a) and 140(b), respectively, a check unit 160, and a retirement unit 170. In the following discussion, references to execution clusters 140(a) and 140(b) are not indexed unless necessary to avoid ambiguity. References to other resources in processor 100 that may be duplicated, such as the execution units that make up execution clusters 140 are treated similarly.

For the disclosed embodiment, each execution cluster 140 includes a branch execution unit (BRU) 152, an integer execution unit (IEU) 154, a memory management (load/store) unit (MMU) 156, and a floating point unit (FPU) 158 (generically, "execution units"). Different embodiments of processor 100 may include different types and numbers of execution units without departing from the scope of the present invention. For example, the Itanium processor of Intel® Corporation employs a branch execution unit that include three separate branch execution units. Execution clusters 140 are shown separated to illustrate their logical organization in HR mode, not to reflect any actual separation between the different execution resources.

Other embodiments of processor 100 may not duplicate all execution units 150 or may not duplicate instructions to certain execution units. For example, branch execution units require significant processor resources for support, and considerable die area may be saved by not duplicating BRU 152. This is indicated by the dashed box around BRU 152(b) in FIG. 1. In this case, branch instructions may either not be executed redundantly, or alternate mechanisms may be employed to check their execution. For example, branch instructions may be duplicated and executed serially. Similarly, duplicating load and store instructions may saturate bandwidth to the memory system in HR mode. In this case, multiple MMUs 156 may be implemented to accommodate the presence of multiple load and/or store operations in an instruction bundle, but the individual load/store operations are not duplicated these instructions in HR mode. Similar arrangements may be employed for other execution units 150 and instruction types without departing from the spirit of the invention.

I-cache 110 provides instructions to issue unit 120, which directs them to appropriate execution units through register file(s) 130. Depending on the particular implementation of processor 100, instructions may be stored in I-cache 110 as individual instructions, macroinstruction, instruction bundles or similar groupings. Here, an instruction bundle refers to a grouping of one or more instruction syllables, each of which is executed by a particular one of execution units 150. For example, an instruction bundle may include a LOAD instruction syllable, a MOV (move) instruction syllable and a FADD (floating point add) instruction syllable. Issue unit 120 directs the LOAD, MOV, and FADD syllables to MMU 156, IEU 154, and FPU 158, respectively.

A macro-instruction refers to an instruction that may be decoded into one or more micro-instructions or micro-operations ($\mu$ops), suitable for implementation by one of the execution units. For this case, issue unit 120 directs integer pops to IEU 154, floating point $\mu$ops to FPU 158, etc. In the following discussion, "instruction" is used to refer to the output of I-cache 110, whatever its form, or to the collection of "$\mu$ops" (instruction syllables) that make up the instruction (instruction bundle). The term, "$\mu$op", generally refers to the individual components of an instruction that are directed to various ones of the execution units, e.g. a $\mu$op or instruction syllable.

For the disclosed embodiment of processor 100, register files 130 include data register files 132, control/status (C/S) registers 134, and a register rename unit 138. Data register files 132 provide temporary storage for, e.g., the integer and floating point operands that are manipulated by execution units 150. Data register files 132 are multi-ported to allow multiple execution units to access their contents concurrently. For the present invention, multi-porting allows resources in execution clusters 140(*a*) and 140(*b*) to access the same register entry simultaneously in HR mode. Rename unit 138 maps the virtual register identifiers specified in $\mu$ops to the physical registers in register file 130.

Register file(s) 130 may be protected through ECC or parity protection mechanisms. Alternatively, error files 130 may be duplicated, in which case a corrupted register entry is detected when execution results are compared. The latter solution consumes additional area on the processor die.

C/S registers 134 store information that controls the manner in which processor 100 operates and the status of the various execution resources. C/S registers 134 typically include a processor status register (PSR) 180 that provides certain state information about the processor under control of the currently executing process thread. For the disclosed embodiment of processor 100, PSR 180 includes a mode status bit (MSB) 184, which indicates whether processor 100 is in HR mode or HP mode. For purposes of illustration, a value of one in MSB 184 indicates that processor 100 is in HR mode, and a value of zero indicates that processor 100 is in HP mode. Various resources in processor 100, including issue unit 120 and check unit 160, alter their operations according to the logic value stored in MSB 184.

In HR mode, issue unit 120 provides identical instructions to execution clusters 140(*a*) and 140(*b*). That is, issue unit 120 provides the $\mu$ops from an instruction (or the $\mu$ops from identical instructions) to appropriate execution units in: execution clusters 140(*a*) and 140(*b*). Results generated by clusters 140(*a*) and 140(*b*) are compared by check unit 160, and an error is indicated if the execution results are different. In HP mode, execution clusters 140(*a*) and 140(*b*) may be controlled independently to process different instructions. That is, issue unit 120 directs $\mu$ops from different instruction in the process thread to execution clusters 140(*a*) and 140(*b*), effectively doubling the execution resources relative to HR mode.

FIG. 1 also indicates the different stages of instruction processing implemented by the various elements of processor 100. For example, I-cache 110 is exercised for a particular instruction during the fetch (FET) stage of its execution. The instruction is expanded into its component $\mu$ops (EXP stage) by issue unit 120. Operands specified by the instruction are retrieved from register files 130 during the REG stage, and the operands are manipulated according to the $\mu$ops during the EXE stage. The execution results are checked for errors by, among other resources, check unit 160, during the DET stage, and if no errors are found, the instruction is retired during the RET stage.

Instructions and data are provided to processor 100 from a memory system 190. Cache 194 represents a portion of memory system 190 to which results from executed instructions are written. Cache 194 may be located on the same chip as processor 100 or it may be located on a separate chip.

As discussed in greater detail below, one embodiment of processor 100 includes a buffer to decouple front-end stages (FET and EXP) from back-end stages (REG, EXE, DET, and RET) of the instruction pipeline. The buffer temporarily stores fetched instructions. This allows front-end operations to continue, even if back-end operations are temporarily stalled or otherwise delayed. It also allows back-end operations to proceed if front-end operations are temporarily delayed. One embodiment of processor 100 employs a decoupling buffer to correct errors detected in HR mode.

The present invention does not require partition of processor 100 into a particular set of pipeline stages. For example, a disclosed stage may be subdivided into two or more stages to address timing issues or facilitate higher processor clock speeds. Alternatively, two or more stages may be combined into a single stage. Other embodiments may or may not employ a decoupling buffer. The disclosed pipeline provides only one example of how operations may be partitioned in a processor implementing the present invention.

A data cache 148 is also shown for processor 100 to buffer operands between memory system 190 and other resources in processor 100. Depending on timing constraints, data cache 148 may provide operands to register file 130 or directly to execution resources in the EXE stage of the instruction pipeline.

Figure 2:
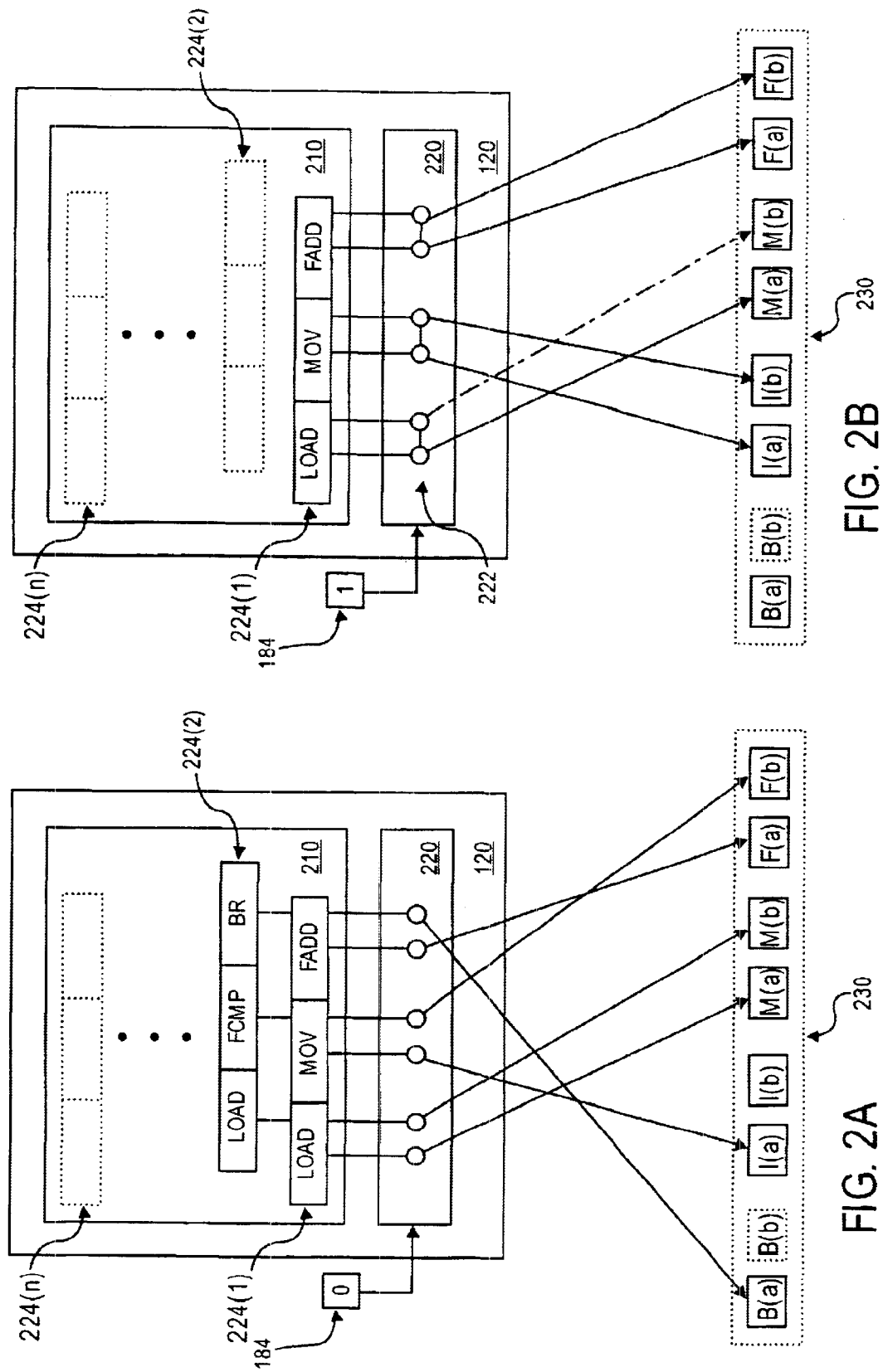
FIGS. 2A and 2B are block diagrams of one embodiment of the issue unit of FIG. 1 in high reliability (HR) and high performance (HP) modes, respectively.

FIGS. 2A and 2B are schematic representations of one embodiment of issue unit 120 as it operates in HP and HR modes, respectively. For the disclosed embodiment, issue unit 120 comprises an instruction queue 210 and dispersal logic 220. Instruction queue 120 receives instructions from I-cache 110 and temporarily stores them in slots 224(1)–224(*n*) (generically, "slots 224"). Dispersal logic 220 expands instructions from selected slots 224 into their component pops and directs the $\mu$ops the to staging latches 230 associated with different execution units 150. For the disclosed embodiment, staging latches B(a), I(a), M(a), and F(a) serve as ports to BRU 152(a), IEU 154(a), MMU 156(a), and FPU 158(a), respectively, or their corresponding register files. Similarly, staging latches B(b), I(b), M(b), and F(b) serve as ports to BRU 152(b), IEU 154(b), MMU 156(b), and FPU 158(b), respectively, or their corresponding register files.

The instructions processed by dispersal logic 220 on each clock cycle and the mapping function used to assign their component µops to staging latches 230 are determined by the logic value stored in MSB 184. In FIG. 2A, MSB 184 is set to zero, indicating that processor 100 is in HP mode. In this mode, dispersal logic 220 expands instructions stored in slots 224(1) and 224(2) into their component pops and maps them to the first available staging latch 230 appropriate to the type of operation indicated. For example, the LOAD, MOV, and FADD (floating point ADD) µops of the instruction in slot 224(1) are mapped to latches M(a), I(a), and F(a), respectively, and the LOAD, FCMP (floating point compare), and BR (branch) µops of the instruction in slot 224(2) are mapped to latches M(b), F(b), and B(a), respectively.

In HP mode, there is no correlation between the cluster to which an execution unit 150 (and its associate staging latch 230) belongs and the instruction slot in queue 210 from which it receives its µop. For example, the BR µop from slot 224(b) is mapped to B(a). If the FADD in slot 224(a) is replaced by an integer ADD, it would be mapped to I(b), and the FCMP from slot 224(2) would be mapped to F(a).

FIG. 2B represents issue unit 120 in when processor 100 is in HR mode, where MSB 184 is set to one. In HR mode, dispersal logic 120 expands the instruction in slot 224(a) only and maps each component µop to staging latches 230 associated with corresponding execution units 150 in execution clusters 140(a) and 140(b). For example, the LOAD µop from slot 224 is mapped to M(a) and M(b). The MOV pop is mapped to I(a) and I(b), and the FADD lop is mapped to F(a) and F(b). In HR mode, identical µops are executed in parallel by execution clusters 140(a) and 140(b) to generate execution results for each µop that may be compared for consistency.

As noted above, other processor embodiments for implementing the present invention may not duplicate certain execution units or may not duplicate µops in HR mode, e.g. BRU and load/store operations, respectively. If only one BRU 152 is provided, for example, B(b) is not present (dashed box). For this embodiment, checking may be suspended for BRU operations or the same branch instruction may be executed on successive clock cycles and the results compared. If load store operations are not duplicated, the connection between nodes 222 in dispersal logic 220 may be eliminated.

Figure 3:
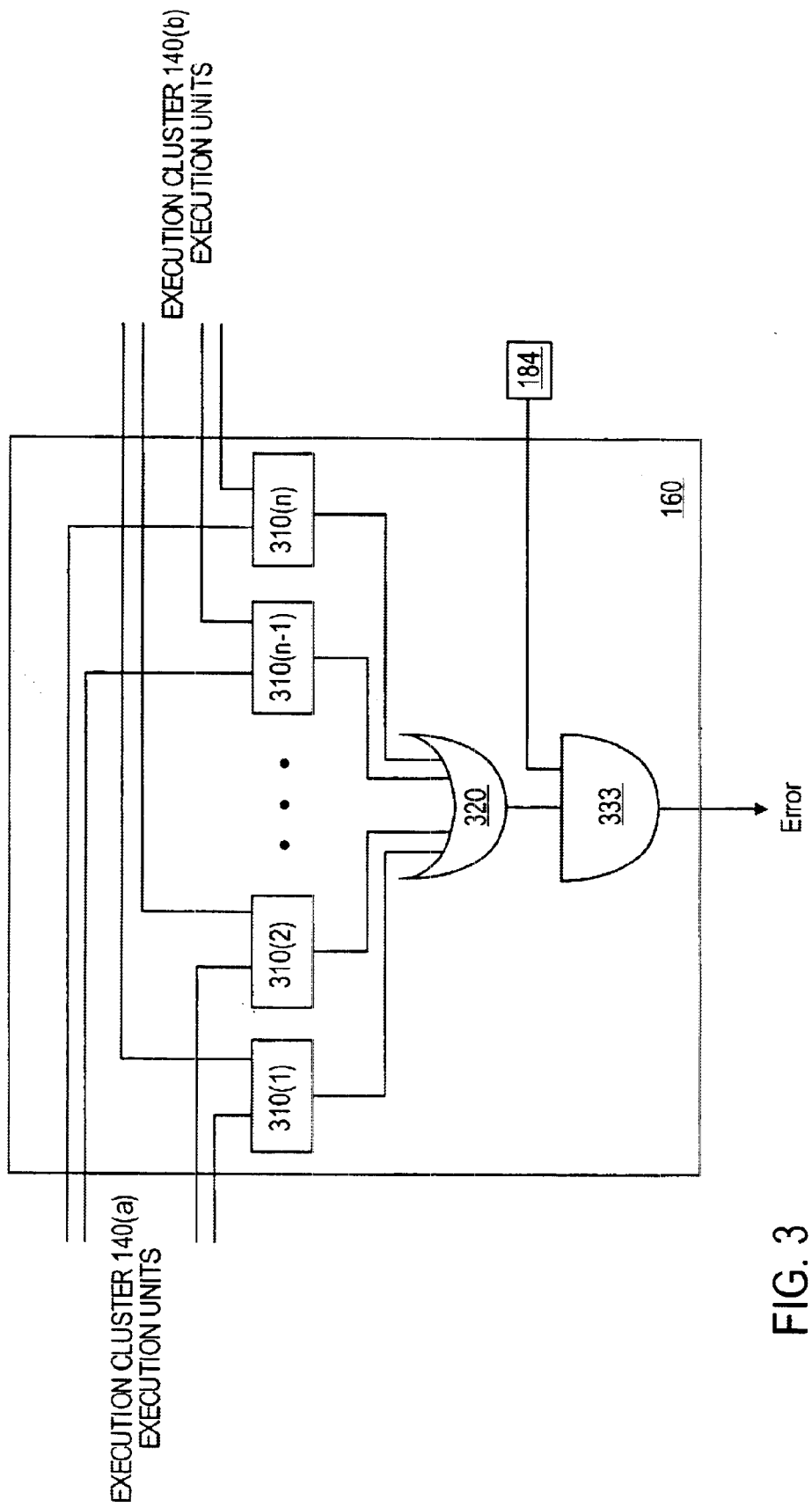
FIG. 3 is a block diagram of one embodiment of the check unit of the processor in FIG. 1.

FIG. 3 is a block diagram representing one embodiment of check unit 160 in accordance with the present invention. The disclosed embodiment of check unit 160 includes "n" comparators 310(1)–310(n), an OR gate 320, and an AND gate 333. A comparator 310 is provided for each execution unit in an execution cluster 140. For the disclosed embodiment of processor 100, each execution cluster includes BRU 152, IEU 154, MMU 156, and FPU 158, and check unit 160 includes 4 comparators 310. Comparator 310(1), 310(2), 310(3) and 310(4) monitor outputs of the BRUs 152(a), 152(b), IEUs 154(a), 154(b), MMUs 156(a), 156(b), and FPUs 158(a), 158(b), respectively, from execution clusters 140(a) and 140(b).

For the disclosed embodiment of check unit 160, each comparator 310 generates a logic value zero when the execution results applied to its inputs match and a logic value one when the execution results do not match. OR gate 320 generates a logic value one when any of comparators 310 indicates that its corresponding execution results do not match. The output of OR gate 320 serves as an ERROR signal when AND gate 333 is enabled. For the disclosed embodiment, this occurs when MSB 128 is set to one, i.e. when processor 100 is in HR mode.

Persons skilled in the art of processor design and having the benefit of this disclosure will recognize other variations on check unit 160 that may be activated to monitor results in execution cores 110 when processor 100 is in HR mode. Similalry, modifications of check unit 160 for implementations that do not replicate certain execution units or operations (in HR mode) will be apparent to those skilled in the art.

The disclosed embodiment of processor 100 may switch between HR and HP modes in response to mode switch instructions (or instruction bundles) or on the occurrence of certain conditions, e.g. issue of an instruction from a region of memory designated as UC. In the following discussion, S_HR represents one or more instructions that switch processor 100 from HP to HR mode ("HP-to-HR mode switch"), and S_HP represents one or more instructions that switch processor 100 from HR to HP mode ("HR-to-HP mode switch"). Mode switch instructions may be scheduled through an application, e.g. by a linker, following compilation, by a firmware routine, by the operating system (OS) code or some combination of these codes.

For one embodiment of the invention, a mode switch instruction may be prepended to an application thread to switch processor 100 to an appropriate execution mode before the thread is executed. For another embodiment, mode switch instructions may be incorporated into an OS scheduling routine, which is run prior to executing a new process. The OS determines the mode in which the thread is to be executed, and schedules the appropriate mode switch instruction, as needed, ahead of the process. For yet another embodiment, a condition such as fetching an instruction from a memory location that is designated as UC may switch the processor mode through a hardware mechanism or a firmware routine. The present invention is independent of the particular mechanism through which mode switch instructions are scheduled.

Figure 4:
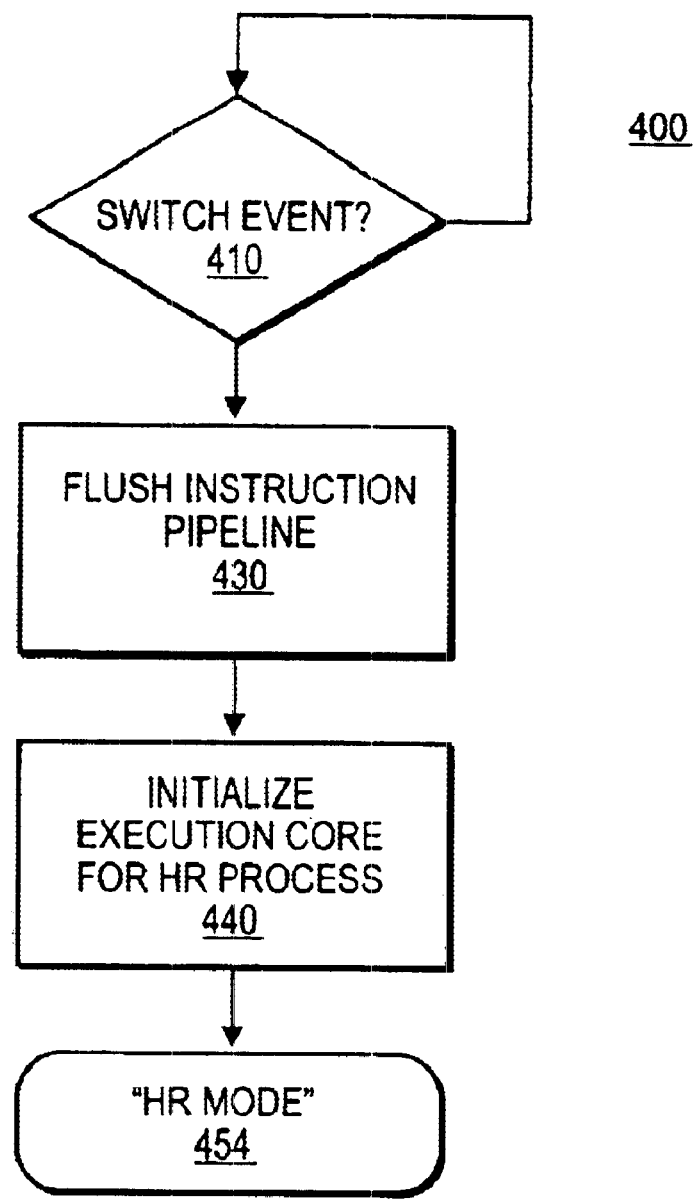
FIG. 4 is a flow chart representing one embodiment of a method implemented by the processor of FIG. 1 in response to HP-to-HR and HR-to-HP mode switch instructions.

FIG. 4 is a flow chart representing one embodiment of method 430 for switching the processor to a HR (HP) mode. Method 400 represents the operations performed by processor 100 in response to a mode switch event, such as detection of an S_HR (S_HP) instruction or a mode switch condition. When the event is encountered 410, the instruction pipeline is flushed 430 of any remaining instructions, and the execution core is initialized 440 for the upcoming HR (HP) process. This entails, for example, initializing the C/S registers to values appropriate for the HR (HP) process. In particular, the MSB is set to one (zero) to indicate that the new thread is to be executed in HR (HP) mode. When the register files are duplicated, it may be necessary to initialize the data in one register file to match that in the other register file. Processor 100 is in HR (HP) mode when the C/S registers are initialized for the HR (HP) thread and the MSB is set to one (zero).

Figure 5C:
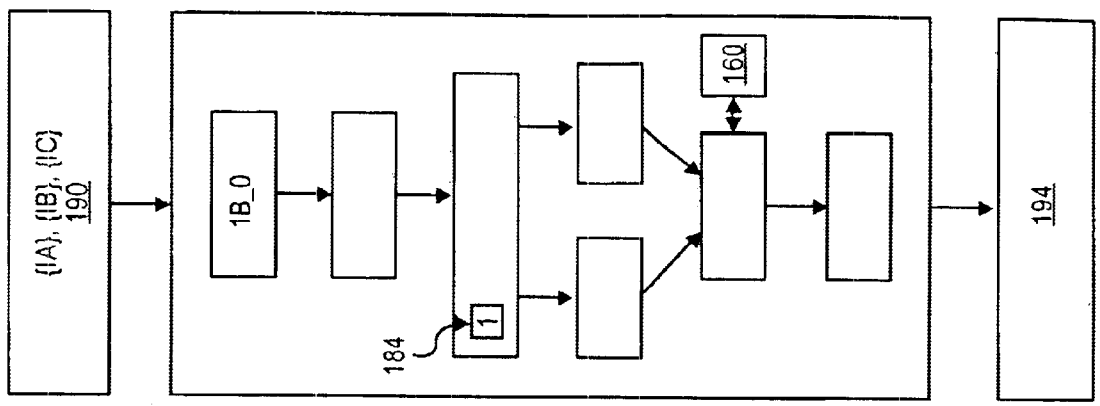
FIGS. 5A–5E represent the processor of FIG. 1 at various points in a transition from high performance (HP) mode to high reliability (HR) mode.
Figure 5B:
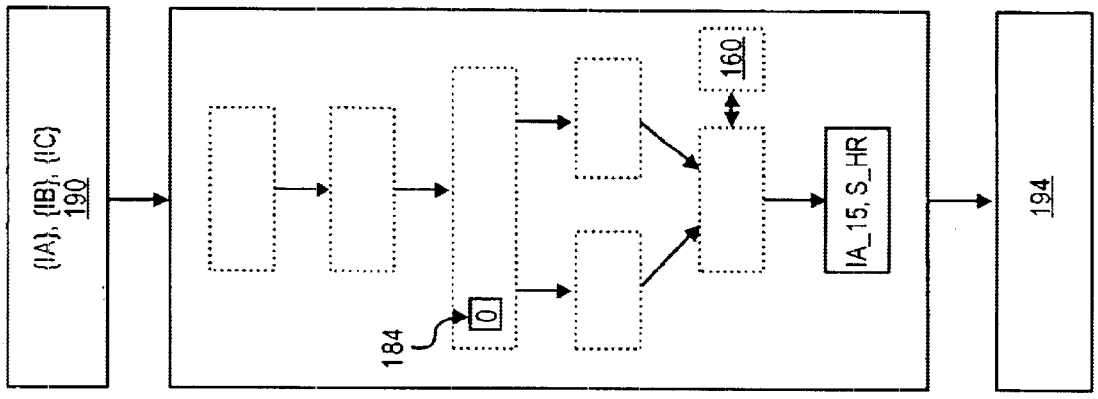
Figure 5A:
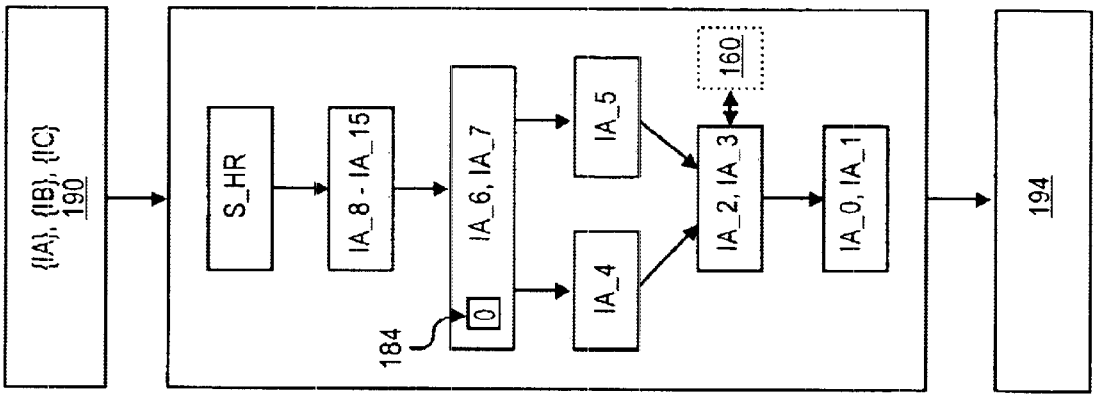

Software controlled mode switching in accordance with the present invention is illustrated for an HP to HR transitions in FIGS. 5A–5C. These figures represent the states of processor 100 at various times during its switch from HR to HP modes. The pipeline states represented in FIGS. 5A–5D are independent of how the mode switch instructions are scheduled onto the execution cores. Pipeline stages are indicated on the left hand side of the figures.

FIG. 5A represents an embodiment of processor 100 that is executing process A {IA} while process B {IB} and process C {IC} await execution in memory system 190. In this example, processes A and C are to be executed in HP mode ("HP processes"), and process B is a critical code segment which is to be executed in HR mode ("HR process").

With process A executing in HP mode, MSB 184 is set to zero and check unit 160 is deactivated (indicated by dashed lines). IA_n represents the $n^{th}$ instruction(s) for thread A, and each pipe stage is labeled by the instruction(s) on which it is currently operating. The disclosed embodiment of processor 100 is capable of executing up to two instructions (or instruction bundles) in parallel. This is indicated by the presence of two instructions in the REG, EXE, DET, and RET stages. For example, IA_0 and IA_1 are in the RET stage, IA_2 and IA_3 are in the DET stage. The disclosed embodiment of processor 100 includes an eight-entry queue in its EXP stage, as indicated by the instructions IA_8 though IA_15. S_HR has just entered the FET stage. Similar designations are used for instructions from processes C and D.

FIG. 5B represents processor 100 at a later time when IA_15 and S_HR have reached the RET stage of processor 100. No instructions are indicated in the preceding stages of processor 100 because different mechanisms may schedule different instructions following S_HR and, in any event, a subsequent instruction flush makes their identity irrelevant. Depending on the implementation, the instructions in these pipe stages may be no-operations (NOPs), instructions from current or pending threads, or no instructions at all.

FIG. 5C represents processor 100 one or more clock cycles after IA_15 and S_HR are retired. Processor 100 is flushed, MSB 184 is set to one, check unit 160 is activated (solid line), and an instruction from the HR process (IB_0) has entered the instruction pipeline. Although not indicated in the figure, C/S registers 234, data registers 238, and data cache 244 are initialized, as needed, for thread B.

Figure 5E:
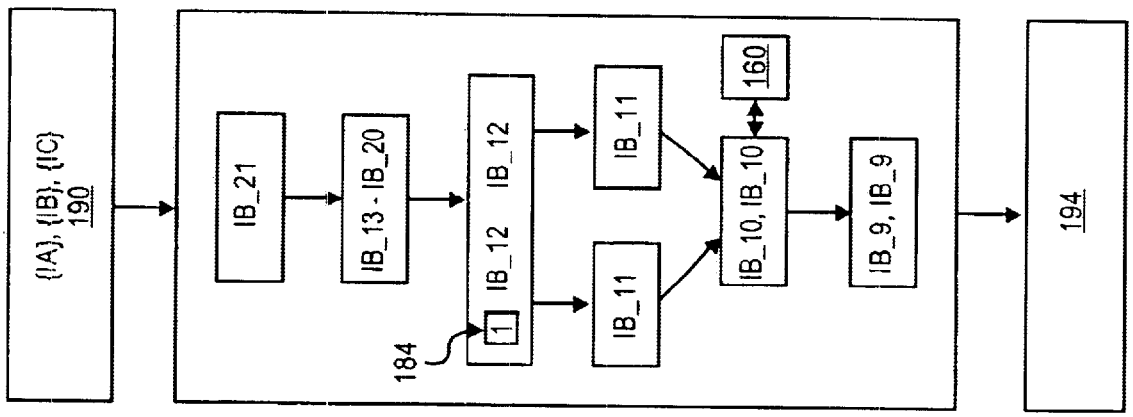
Figure 5D:
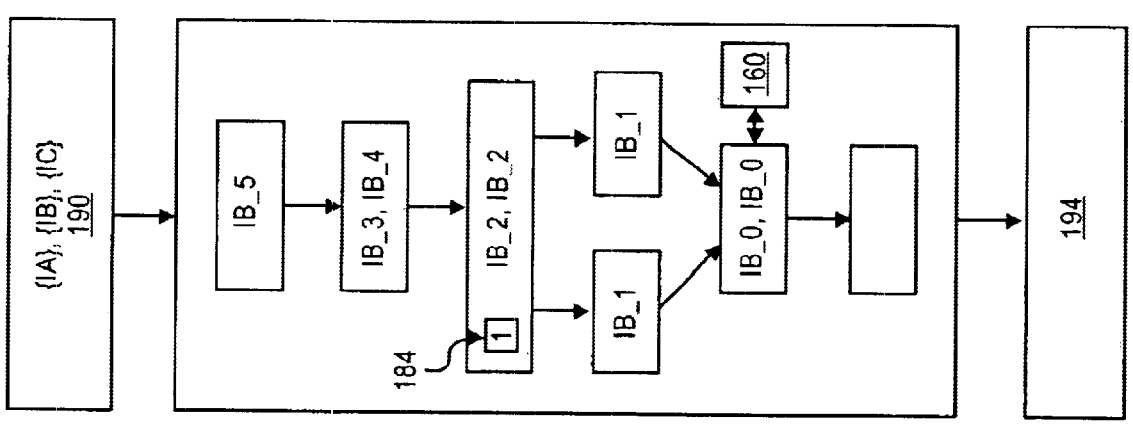

FIG. 5D shows processor 100 several clock cycles later, when the first instruction(s) from process B has progressed to the DET stage. IB_5 has just entered the instruction pipeline, IB_3 and IB_4 are resident in the instruction queue of the EXP stage. Following the EXP stage, identical copies of IB_2, IB_1, and IB_0 are being processed in the REG, EXE, and DET stages, respectively. In particular, copies of IB_0 are reading the same operands from data register files 130 in the REG stage. Copies of IB_1 are being processed in execution clusters 140(a) and 140(b) in the EXE stage, and execution results from copies of IB_0 are being compared by check unit 160 in the DET stage.

FIG. 5E shows processor 100 after several additional clock cycles of operation in HR mode. At this point, instructions have accumulated in the instruction queue of EXP stage, and process B instructions are retiring at the back-end of the instruction pipeline, as long as no discrepancy is identified between the execution results from EXE stages (a) and (b).

Switching processor from HR mode to HP mode follows a similar series of operations, once the mode switch instruction is detected.

Figure 6C:
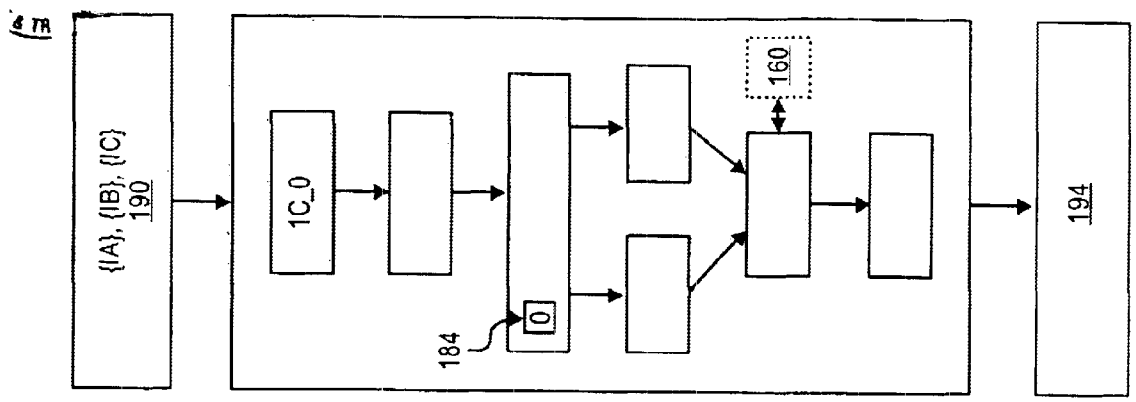
FIGS. 6A–6E represent the processor of FIG. 1 at various points in a transition from HR mode to HP mode.
Figure 6B:
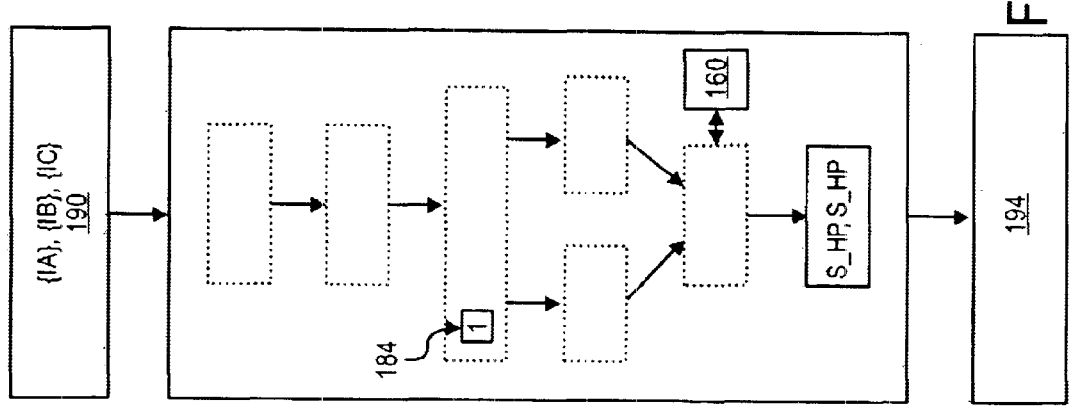
Figure 6A:
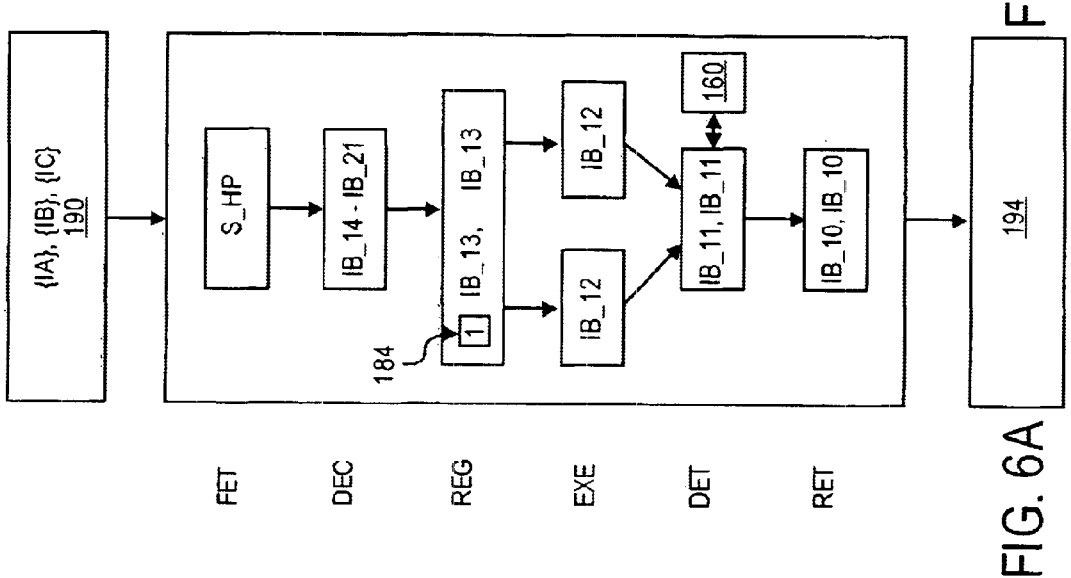

FIGS. 6A through 6D represent processor 100 at various points as it switches from HR mode to HP mode. In FIG. 6A, thread B is executing in HR mode. Accordingly, MSB 184 is set to one, check unit 160 is activated, and instructions, IB_n, are being processed through the backend pipe stages (REG, EXE, DET, and RET) in lock step. A mode switch instruction, S_HP, is in the FET stage of processor 100.

In FIG. 6B, the mode switch instruction has reached the RET stage, and no errors have been detected by check unit 160. Depending on the particular implementation of processor 100, various algorithms may be employed to schedule instructions behind the S_HP instructions. As in the HP to HR switch discussed above, instructions in the preceding pipe stages are not identified since their identity may vary with the scheduling algorithm employed and they will be flushed when the mode switch instruction retires.

FIG. 6C shows processor 100 following retirement of S_HP. The pipe stages are flushed, and MSB 184 is set to zero. Setting MSB 184 to zero deactivates check unit 160 and signals that processor 100 is in HP mode. In addition, processor 100 initializes S/C registers 234, data registers 238, and data caches 244 for the upcoming process.

Figure 6E:
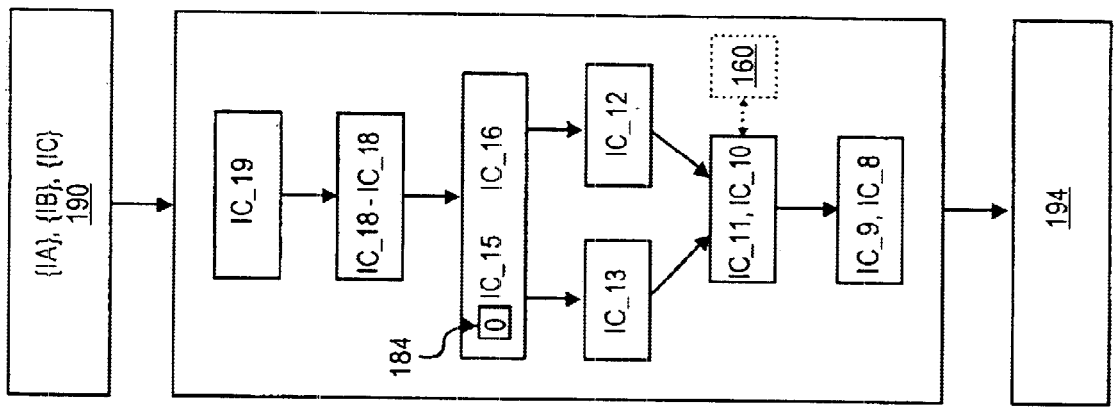
Figure 6D:
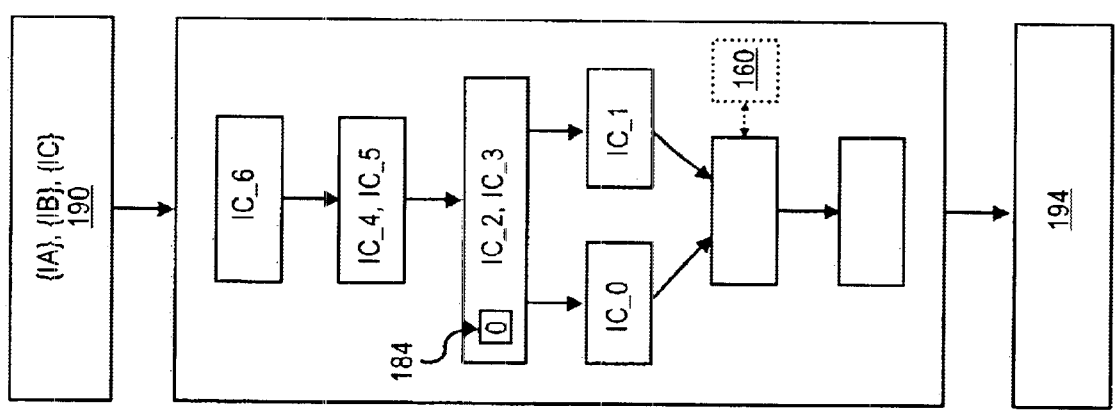

FIG. 6D represents processor 100 several clock cycles following the switch to HP mode. Instructions from process C have entered the instruction pipeline. Two instructions are currently pending in the instruction queue of the EXP stage. IC_2 and IC_3 are in the REG stage, and IC_0 and IC_1 are in the EXE stages associated with execution clusters 140(a) and 140(b), respectively. Depending on process priority and the scheduling algorithm employed, thread A, which was suspended when the processor 100 switched to HR mode, may be activated instead of thread C.

FIG. 6E represents processor 100 several clock cycles later, when the instruction pipeline of processor 100 is filled with instructions from thread C.

As indicated in FIGS. 5A–5E and FIGS. 6A–6E, mode switch instructions S_HR and S_HP, respectively, trigger a series of operations in processor 100. S_HR and S_HP may each be implemented as a series of instructions. For example, a serialize instruction flushes the pipe stages, and move instructions update mode bit(s) 180 and initialize selected S/C registers 234.

The full benefits of HR mode are realized when its enhanced error detecting capability is combined with a mechanism for correcting the detected errors. In HR mode, check unit 160 compares execution results from execution clusters 140(a) and 140(b) in the DET stage, to determine whether an error has occurred. When no discrepancy is detected, the corresponding instruction(s) are allowed to retire. For one embodiment of the invention, a recovery mechanism is implemented when a discrepancy is detected. The recovery mechanism may be implemented in hardware, software, firmware or some combination of these.

The soft errors targeted by the present invention are unlikely to occur in both execution clusters 110 simultaneously. Consequently, differences in execution results detected by check unit 160, in the absence of errors originating in parity/ECC protected arrays, are most likely due to soft errors in the circuitry of execution clusters 140. Since these errors occur relatively infrequently, one method for correcting them is to flush the instruction pipeline (or portions thereof) and re-execute the flushed instructions, beginning with the instruction that triggered the error.

One way to re-execute instructions is to resteer the execution core of the processor back to the instruction that generated the mismatch. This may be done, for example, by flushing the processor's execution pipeline and providing an instruction pointer (IP) associated with the instruction to fetch unit 110. This approach re-executes the instructions beginning with the instruction that generated the mismatch. Since soft errors are random and infrequent, the error is unlikely to be repeated on a second iteration of the instructions. This approach re-executes instructions through the entire pipeline. As discussed below, replay is another hardware based correction mechanism that re-executes instructions through only the back end stages of the pipeline.

Figure 7:
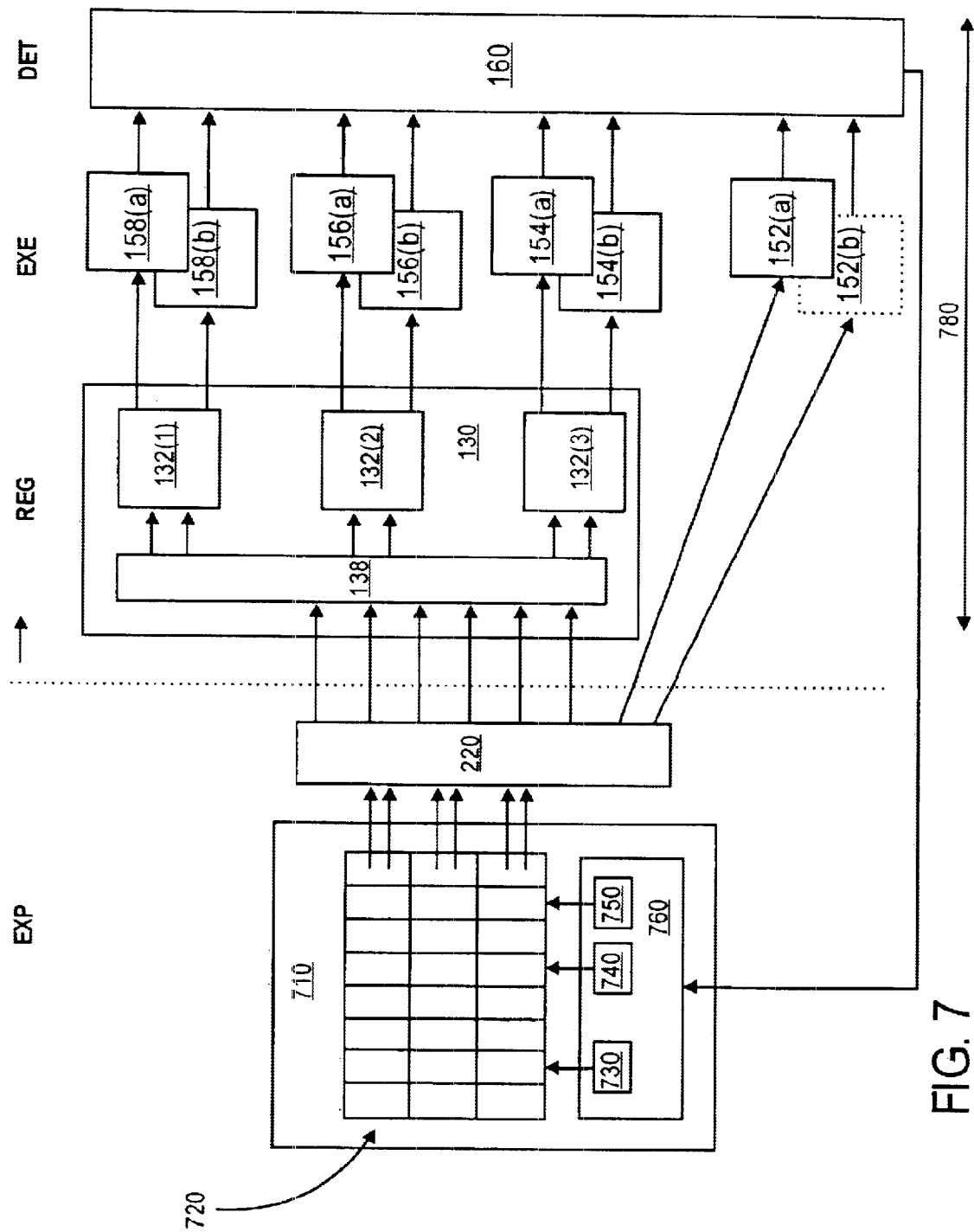
FIG. 7 is a block diagram of one embodiment of a replay queue that may be used to correct errors detected in HR mode.

FIG. 7 is a block diagram of one embodiment of a replay queue 710 and associated logic that may be used in issue unit 120 for error correction. The disclosed embodiment of replay queue 710 includes multiple slots 720 to store fetched instructions, pointers 730, 740, 750 to track the status of the stored instructions, and control logic 760 to manage pointers 730, 740, 750. For the disclosed embodiment, instruction cache 110 provides an instruction (or instruction bundle) to an available slot 720. The stored instruction(s) is expanded into one or more $\mu$ops by a dispersal unit 220 and issued to a back end 780 of the processor pipeline. For the disclosed embodiment of processor 100, back end 780 includes circuitry associated with the REG, EXE, DET, and RET stages of the processor.

Control unit 760 updates pointers 730, 740, 750 as new instructions are transferred to queue 710, issued to back-end 780, and retired, respectively. For the disclosed embodiment, pointers 730, 740, 750 are updated as instructions are received from FET stage, transferred to REG stage, and retired in RET stage, respectively. For this embodiment, pointer 730 ("head pointer") indicates the latest instruction(s) to enter queue 710, pointer 740 ("tail pointer") indicates the next instruction(s) to be issued to the REG stage, and pointer 750 indicates the next instruction to be retired ("replay pointer") from RET stage.

At a given time, the instructions in the slots that follow tail pointer 730, up to and including the instruction(s) indicated by replay pointer 750, are being executed in back-end 780. Head pointer 730 is updated when a new instruction enters the REG stage, tail pointer 740 is updated when a new instruction enters replay queue 710 from instruction cache 110, and replay pointer 750 is updated when the instruction to which it currently points enters the RET stage.

When the disclosed embodiment of processor 100 is operating in HR mode, check unit 160 compares execution results from execution clusters 140(a) and 140(b) in the DET stage, and signals an error and flushes back-end 780 if a discrepancy is detected. When control unit 760 detects the error signal, it adjusts tail pointer 730 to indicate the slot currently indicated by replay pointer 750. This effectively reschedules all un-retired instructions that are currently in back-end 780 for (re)issue to the REG stage. For one execution cluster 140, the instruction(s) indicated by replay pointer 750 is the source of the erroneous execution result, and the instruction(s) in the slots between head pointer 730 and replay pointer 750 follow this error-generating instruction in the back-end of the pipeline. All of these instruction(s) may be flushed from the back end of the pipeline, and reissued by replay queue 710, beginning with the instruction(s) that triggered the error.

Another embodiment of replay queue 710 tracks dependencies between instruction in addition to their status in backend 780. This embodiment of replay queue 710 flushes and replays only the instructions that triggered the error and the issued $\mu$ops that depend on it ("partial replay").

Yet another embodiment of replay queue 710 employs a shift register, which physically shifts instruction(s) down the queue 710 as earlier instruction(s) are retired. In this embodiment, the oldest, unretired instruction(s) is at the end of queue 710, and a separate replay pointer is not needed. As in the above embodiments, head pointer 730 indicates the next instruction to issue to the back end and tail pointer 740 indicates the last instruction to enter queue 710.

Another mechanism for correcting errors in processor 100 applies parity checks at various points in the instruction execution pipeline. The resulting parity-protected execution units 150 complement parity/ECC protected caches and storage arrays. A processor with dual, parity-protected execution clusters can determine not only when a soft error event occurs, but also which execution cluster suffered the soft error event and, consequently, which execution cluster provides an uncorrupted result. The uncorrupted result may then be used to update the processor's architectural state and correct any errors in the execution core that suffered the soft error event.

For the data path and execution logic, soft errors are most likely to occur in elements such as staging latches and registers. These elements store voltage levels that represent operand values or $\mu$ops at various points of the instruction pipeline. A parity bit may be associated with each operand and/or $\mu$op in the instruction pipeline, and checked subsequently against a value derived from the operand or $\mu$op, respectively. Alternatively, the parity value for an operand or $\mu$op may be checked against the parity bit associated with the corresponding operand or $\mu$op in the other execution core. Parities may be checked at various points along the pipeline or, staged along the pipeline with their associated operands or $\mu$ops and checked all at once in the DET stage.

One advantage of implementing parity protection in conjunction with execution clusters 140 is that the correct execution result may be determined without need to re-execute the instructions. For example, if check unit 160 detects a, discrepancy between the execution results (by comparing their values or their parity bits), it can compare the calculated parities for the results against their corresponding parity bits to determine which result is correct. The execution cluster 140 providing the correct result may then update the processor's state and make any corrections necessary to the C/S or data registers of the execution core that produced the error.

For yet another embodiment of the invention, check unit 160 may trigger machine check that implements an error handling routine in firmware when a soft error is detected. The firmware routine may be invoked when an error is first indicated or it may be invoked after a hardware mechanism, such as the above-described replay queue, fails to correct the error.

Figure 8:
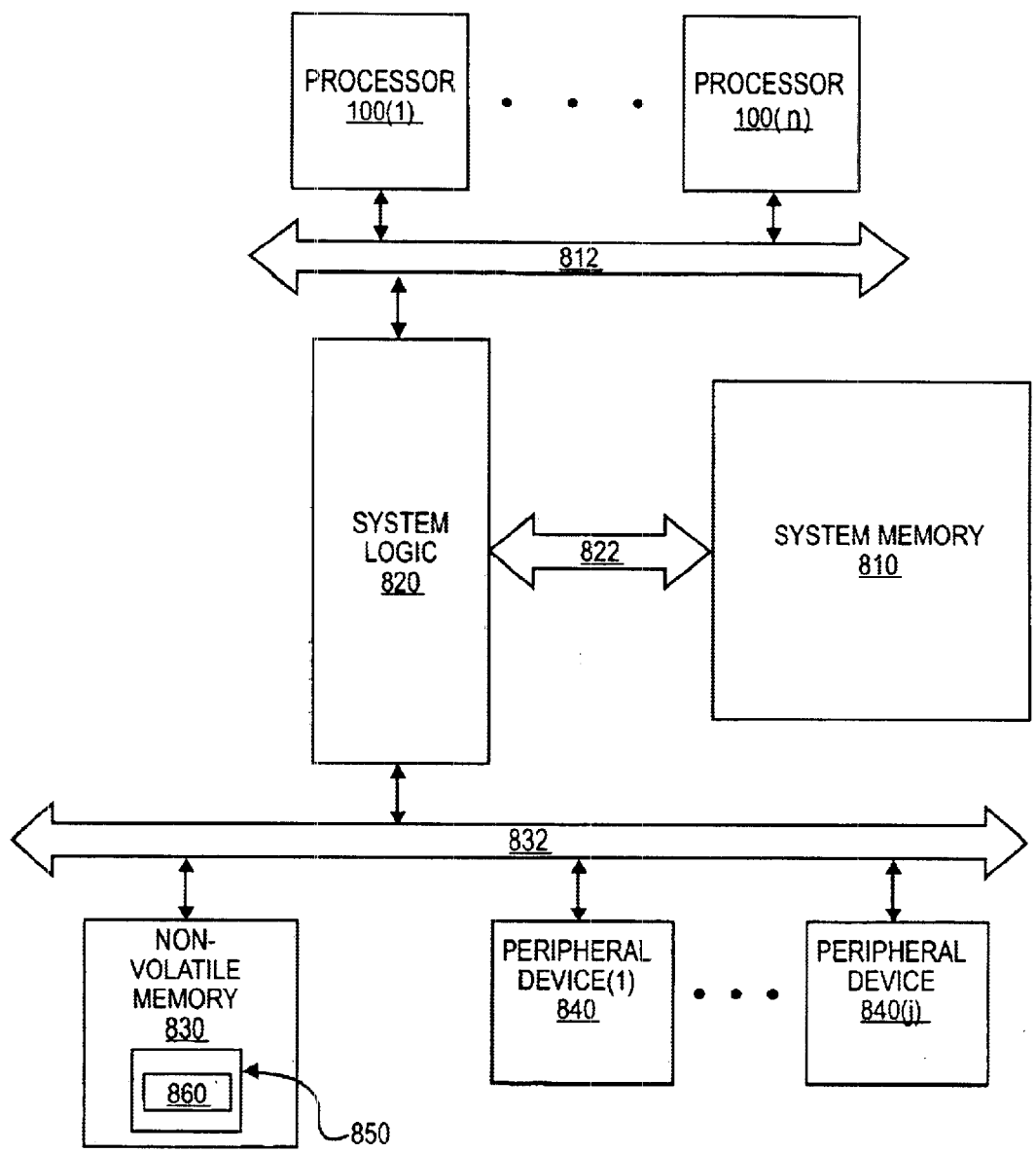
FIG. 8 is a block diagram of a computer system that implements the present invention, including a firmware-supported recovery mechanism.

FIG. 8 is a block diagram of a computer system 800 in which a firmware recovery routine for correcting soft errors is implemented. Computer system 800 includes one or more processors 100, a main memory 810, system logic 820, and a non-volatile memory 830. Peripheral devices 840 for implementing, e.g., various input/output (I/O) functions are also shown. Processor(s) 100, memory 810, non-volatile memory 830, and peripheral devices 840 are coupled through system logic 820 by processor bus 812, memory bus 822, and peripheral bus 832, respectively. System logic 820 handles communications among processors 100, memory 810 and non-volatile memory 830. The configuration of computer system 800 shown in FIG. 8 illustrates just one of many configurations that may be used to implement the present invention.

For computer system 800, non-volatile memory 830 stores a firmware system 850 that includes an error handling routine 860. Error handling routine 860 is accessed when check unit 160 in one of processors 100 signals an error in HR mode. One embodiment of routine 860 operates in conjunction with parity protected register files and/or staging latches in execution clusters 140. When an error is detected, processor 100 executes routine 860 to read parity bits associated with the registers and/or latches to determine where the error lies. Provided sufficient data is tracked for the various storage structures, e.g. ECC bits, the corrupted data may be restored to its uncorrupted form by error handling routine 860.

There has thus been disclosed a system that dynamically adjusts the operating mode of a processor according to the type of code the processor is executing. The processor includes an issue unit that provides instructions to dynamically configurable execution clusters. In a high reliability mode, the issue unit provides identical instructions to the execution cluster. The instructions are processed in lock step and the results compared to detect soft errors. In high performance mode, the issue unit provides different instructions to the execution clusters, increasing the execution resources available to process the code. The processor may be switched between the modes under software or hardware control.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

I claim:

1. A processor comprising:
    first and second execution clusters including a first plurality of execution resources and a second plurality of execution resources, respectively, of a plurality of execution units; and
    an issue module to provide instructions to the first and second execution clusters, the issue module to provide different instructions to the first and second execution clusters when the processor is in a high-performance mode and to provide identical instructions to the first and second execution clusters when the processor is in a high reliability mode.

2. The processor of claim 1, wherein the instructions are instruction bundles, each instruction bundle comprising one or more instruction syllables.

3. A processor comprising:
    first and second execution clusters; and
    an issue module to provide instructions to the first and second execution clusters, the issue module to provide different instructions to the first and second execution clusters when the processor is in a high-performance ("HP") mode and to provide identical instructions to the first and second execution clusters when the processor is in a high reliability ("HR") mode, wherein the instructions are instruction bundles, each instruction bundle comprising one or more instruction syllables, wherein the issue module includes a dispersal module and the first and second execution clusters each includes a plurality of execution units, the dispersal module to direct an instruction syllable in the instruction bundles to one of the plurality of execution units in one or both of the execution clusters, according to whether the processor is in HP or HR mode, respectively.

4. The process of claim 3, further comprising a check unit to compare execution results from the first and second execution clusters when the processor is in high reliability mode and to signal an error when the execution results do not match.

5. The processor of claim 4, wherein the check unit is deactivated when the processor is in high performance mode.

6. The processor of claim 3, further comprising an execution mode bit, the execution mode bit being in a first logic state when the processor is in HR mode and in a second logic state when the processor is in HP mode.

7. The processor of claim 6, wherein the issue module provides identical or different instructions to the first and second execution clusters according to whether the execution mode bit is in the first or second logic state, respectively.

8. The processor of claim 6, wherein the execution mode bit is set to the first or second logic state by a mode switch instruction.

9. The processor of claim 3, wherein the issue module includes an instruction queue having first and second instruction slots, the instruction module to issue instructions in the first and second slots to the first and second execution clusters, respectively, when the processor is in the high performance mode.

10. The processor of claim 9, wherein the issue module issues instructions from the first slot to the first and second execution clusters when the processor is in the high reliability mode.

11. A computer system comprising:
    a memory to store a plurality of instructions, including a mode switch instruction; and
    a processor including
        first and second execution clusters including a first plurality of execution resources and a second plurality of execution resources, respectively, of a plurality of execution units; and
        an issue module to provide identical instructions to the first and second execution clusters when the processor is in a first mode and to provide different instructions to the first and second execution clusters when the processor is in a second mode, the processor switching between the first and second processor modes in response to the mode switch instruction.

12. The computer system of claim 11, wherein the issue module includes a plurality of slots, the issue module to provide instructions from a first and second of the plurality of slots to the first and second execution clusters when the processor is in the second mode and to provide instructions from the first slot to the both the first and second execution clusters when the processor is in the first mode.

13. The computer system of claim 12, wherein the processor includes an execution mode status bit, and the issue module provides instructions to the execution clusters according to a logic state of the execution mode status bit.

14. The computer system of claim 11, wherein the processor includes an execution mode status bit that indicates to the issue module whether the processor is in the first or second execution mode.

15. A computer system comprising:
    a memory to store a plurality of instructions, including a mode switch instruction; and
    a processor including
        first and second execution clusters; and
        an issue module to provide identical instructions to the first and second execution clusters when the processor is in a first mode and to provide different instructions to the first and second execution clusters when the processor is in a second mode, the processor switching between the first and second processor modes in response to the mode switch instruction, wherein the issue module includes a plurality of slots, the issue module to provide instructions from a first and second of the plurality of slots to the first and second execution clusters when the processor is in the second mode and to provide instructions from the first slot to the both the first and second execution clusters when the processor is in the first mode, wherein the mode switch instruction includes first and second mode switch instructions that set the execution mode status bit to first and second logic states, respectively, when the processor is to switch to the first and second execution modes; and an execution mode status bit, wherein the issue module provides instructions to the execution clusters according to a logic state of the execution mode status bit.

16. The computer system of claim 15, wherein the processor further comprises a check unit that compares execution results generated by the first and second execution clusters when the processor is in the first mode and signals an error if the execution results do not agree.

17. The computer system of claim 16, wherein the check unit is deactivated when the processor is in the second mode.

18. A computer system comprising:

a memory to store a plurality of instructions, including a mode switch instruction, and a processor including first and second execution clusters; and an issue module to provide identical instructions to the first and second execution clusters when the processor is in a first mode and to provide different instructions to the first and second execution clusters when the processor is in a second mode, the processor switching between the first and second processor modes in response to the mode switch instruction, wherein the mode switch instruction comprises first and second mode switch instructions, the first mode switch instruction to write a first value to the execution mode status bit when the processor is to switch to the first execution mode, and the second mode switch instruction to write a second value to the execution mode status bit when the processor is to switch to the second execution mode; and an execution mode status bit that indicates to the issue module whether the processor is in the first or second execution mode.

19. The computer system of claim 18, wherein the first mode switch instruction is executed when the processor is in the second mode and a code segment having a first type is scheduled to execute and the second mode switch instruction is executed when the processor is in the first mode and a code segment having a first type is scheduled to execute.

20. A computer system comprising:

a memory to store a process thread;

a processor including:

first and second execution clusters including a first plurality of execution resources and a second plurality of execution resources, respectively, of a plurality of execution units; and an issue module to provide identical instructions to the first and second execution clusters when the processor is in a first mode and to provide different instructions to the first and second execution clusters when the processor is in a second mode, the processor to be switched between the first and second modes in response to a mode switch event.

21. The computer system of claim 20, wherein an instruction in the process thread includes a designation and the mode switch event occurs when the processor detects the designation.

22. The computer system of claim 21, wherein the designation is a bit associated with the instruction, the bit indicating that the instruction is uncacheable.

23. The computer system of claim 20, wherein the process thread includes a mode switch instruction and the mode switch event occurs when the mode switch instruction is retired.

* * * * *

UNITED STATES PATENT AND TRADEMARK OFFICE
CERTIFICATE OF CORRECTION

PATENT NO. : 6,640,313 B1
DATED : October 28, 2003
INVENTOR(S) : Quach

It is certified that error appears in the above-identified patent and that said Letters Patent is hereby corrected as shown below:

Column 3,
Line 4, delete "6E" and insert -- 6D --.

Column 6,
Line 66, delete "pops" and insert -- $\mu$ops --.

Column 7,
Line 13, delete "pops" and insert -- $\mu$ops --.
Line 35, delete "pop" and insert -- $\mu$op --.
Line 36, delete "lop" and insert -- $\mu$op --.

Column 8,
Line 6, delete "333" and insert -- 330 --.

Signed and Sealed this

Twenty-fifth Day of October, 2005

JON W. DUDAS
*Director of the United States Patent and Trademark Office*